Dec. 28, 1965   M. S. POTSAID   3,226,545
RADIATION DOSIMETER WITH A RADIOCHROMIC COUPLE
SUSPENDED IN AN ESSENTIALLY ANHYDROUS
SOLID TRANSLUCENT MATRIX
Filed May 29, 1962   3 Sheets-Sheet 1

INVENTOR.
MAJIC S. POTSAID
BY
Kenway, Jenney & Hildreth
ATTORNEYS

EFFECT OF HALOGENATED HYDROCARBON MOLALITY ON SENSITIVITY

A = p-PHENYLAZOANILINE
B = DIMETHYLAMINOAZOBENZENE
C = 4-PHENYLAZODIPHENYLAMINE

Dec. 28, 1965   M. S. POTSAID   3,226,545
RADIATION DOSIMETER WITH A RADIOCHROMIC COUPLE
SUSPENDED IN AN ESSENTIALLY ANHYDROUS
SOLID TRANSLUCENT MATRIX
Filed May 29, 1962   3 Sheets-Sheet 3
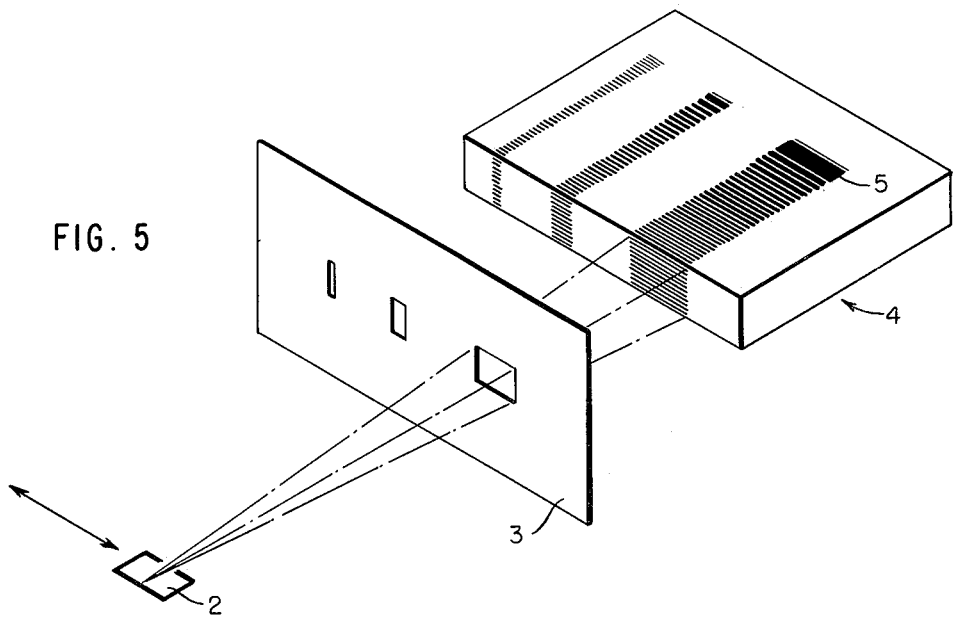
FIG. 5
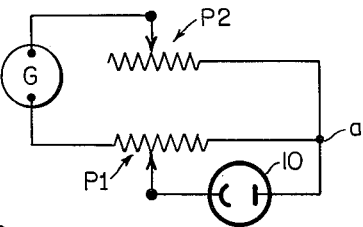
FIG. 6
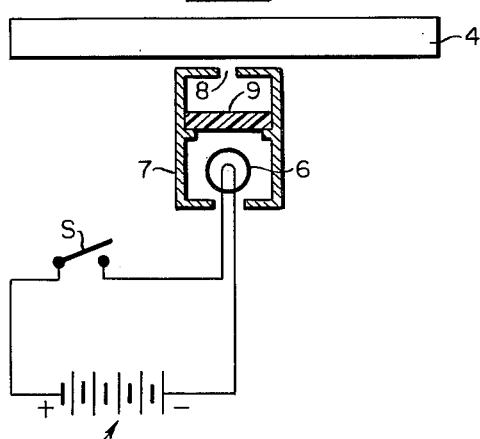
INVENTOR.
MAJIC S. POTSAID
BY
*Kenway, Jenney & Hildreth*
ATTORNEYS 3,226,545
RADIATION DOSIMETER WITH A RADIOCHRO-
MIC COUPLE SUSPENDED IN AN ESSENTIALLY
ANHYDROUS SOLID TRANSLUCENT MATRIX
Majic S. Potsaid, Hanover, Mass., assignor to The Massa-
chusetts General Hospital, Boston, Mass., a corporation
of Massachusetts
Filed May 29, 1962, Ser. No. 198,607
13 Claims. (Cl. 250—83)

My invention relates to the measurement and detection of radiation effects, and particularly to an improved radiation dosimeter for quantitatively measuring radiation and visually indicating the distribution of radiation absorbed in a three-dimensional region.

A great deal of effort has been devoted in recent years to the problem of accurately measuring and controlling radiation exposure. The problem occurs in a great many different fields, but typical and of critical importance is the problem of determining and controlling the distribution and amount of a dose of radiation employed in radiation therapy. Frequently, a cancerous region is located deep within the body or head of a patient, and the problem is to administer a maximum dose of radiation to the specific region to be treated with a minimum absorption of radiation by surrounding tissue. The usual approach to the problem is to rotate the patient while radiation is directed laterally from an adjacent source toward the affected region, the result being that the end of the beam is constantly in the affected region, other portions of the beam passing continuously through non-affected areas. Hence the maximum dose area is coincident with the cancerous area. Alternatively, a number of radiation sources may be arrayed around the patient, and intersecting exposures made through portals in a lead shield. This method is subject to considerable difficulty in that, prior to my invention, it has been extremely difficult to predict the exact effect of a given exposure upon the part to be treated and upon the surrounding tissue. An important object of my invention is to improve the accuracy with which a treatment of this kind can be administered.

Another object of my invention is to facilitate the measurement of the distribution of radiation absorbed in a desired region. Other objects are to improve the accuracy and speed with which radiation can be measured, and to facilitate the teaching of radiation physics to students of medicine, physics, and the like. Still other objects and further advantages of my invention will be apparent to those skilled in the art as my description proceeds.

Basically, a radiation dosimeter in accordance with my invention comprises a solid optically translucent matrix in which a radiochromatic couple is suspended. As here used, the term "radiochromatic couple" means two substances which, when mixed together, respond to radiation by an observable color change. Thus, a radiochromatic couple may simply consist of a radiation sensitive substance which decomposes in response to radiation to yield an indentifiable product, and a colorimetric indicator responsive to the decomposition product of the radiation sensitive substance to indicate by the extent of its color change the amount of decomposition produced. Liquid dosimeters, comprising a radiochromatic couple such as a halogenated hydrocarbon and an acidimetric indicator, dissolved in a solvent, have long been known; however, I have discovered a surprising difference in the behavior of radiochromatic couples suspended in a solid matrix from their behavior in liquid solutions. Specifically, the liquid solutions of radiochromatic couples directly follow Beer's law, in that the higher the concentration of the radiation sensitive substance, the greater the color produced by a given amount of radiation. On the contrary, in a solid matrix, I have found that radiochromatic couples show a maximum color change at a relatively low concentration, and that the color change is much less pronounced at higher concentrations. The specific advantage of this relationship in radiation dosimetry is that by employing a solid matrix having selected radiation absorption characteristics as the major constituent of the dosimeter, I am able to adjust the radiation absorption characteristics of the dosimeter to approximate those of the part to be irradiated. Specifically, in radiation therapy, this property of the dosimeter of my invention makes it possible to construct a model, or in medical terminology a "phantom," of the part to be irradiated, which has radiation absorption characteristics substantially identical with those of the patient to be treated. Such a phantom may be termed an "in-phantom dosimeter," since it is both a phantom and a dosimeter. The solid state of the matrix is also quite convenient in constructing a phantom, since it may be shaped and molded into conformity with the part to be treated. Thus, it is possible to actually test a prescribed treatment, by exposing the phantom, before the patient is put in jeopardy. By slicing the exposed phantom into desired sections, the exact effect of the treatment can be determined in advance, and any necessary corrections can be made.

The manner in which my invention may be carried out, in accordance with the preferred embodiment thereof, will best be understood in the light of the accompanying drawings, together with the following detailed description.

FIG. 5 illustrates a radiation dosimeter in accordance with my invention arranged to be exposed to radiation in such a manner as to illustrate visually the effect which characterizes the absorption of alpha particles and protons; and FIG. 6 comprises a schematic diagram of apparatus used in conjunction with the radiation dosimeter of my invention to provide a precise electrical measurement of the amount of radiation absorbed by the dosimeter.

Figure 1:
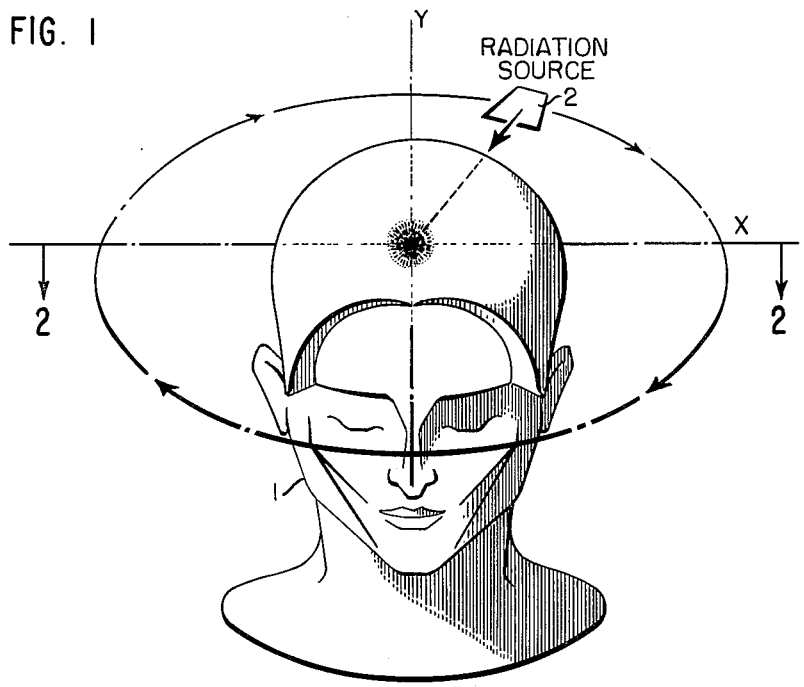
FIG. 1 is a schematic perspective sketch of a radiation dosimeter in accordance with my invention, here shown as an in-phantom dosimeter, in relation to a radiation source to illustrate a typical model radiation.

Referring first to FIG. 1, I have shown an in-phantom dosimeter 1 in accordance with my invention which has been modeled in the form of a human head. Such phantoms may be made in practice by making a silicone rubber mold of the patient's head, in a manner well known to the art, and filling the mold with a dispersion of a radiochromatic couple in a solid matrix. This solid matrix may be plastic, such as the various polymeric resins and the like, characterized by relatively long chain molecules of high molecular weight. It may also be of frozen mineral oil, or other translucent solids of high molecular weight. However, in accordance with a preferred embodiment of my invention, it consists of solid paraffin melting in the range of 65 to 75° C. Preferably, the tendency of the paraffin to crack or craze in the solid form, causing non-uniform optical transmission characteristics, is obviated by including from about 0.2 to 1 percent of purified wax, such as beeswax (myricyl palmitate, $C_{15}H_{31}COOC_{31}H_{63}$), or plastics such as polyethylene, in similar amounts. Larger amounts of beeswax tend to reduce the radiation sensitivity of the dosimeter, presumably because of the

group. Paraffins with plasticizers or synthetic rubbers used in the mounting and sectioning of tissues have been found to be especially suitable as solid matrices. A typical sectioning paraffin of this kind is "Tissuemat," a product of Fisher Scientific Company, 1 Reagent Lane, Fair Lawn, New Jersey. Specially refined microcrystalline paraffin waxes such as Shellwax 300 and Shellwax 700, that mix well with the selected radiochromatic couple, have also been found to be satisfactory.

As the radiochromatic couple, I prefer to employ a halogenated hydrocarbon and an acidimetric indicator such as an azo dye; the amount of the indicator need only be sufficient to produce a desired color indication, and will be small in comparison with the other ingredients. The amount of the halogenated hydrocarbon should be roughly selected in accordance with the criterion that the maximum color change is produced in the range of 1 to 2 moles of halogenated hydrocarbon per thousand grams of solid matrix, and finally selected in the range of ½-molal to 4- or 5-molal concentrations on the basis of the desired radiation absorption characteristics of the dosimeter. For an in-phantom dosimeter, for use with X-rays in the diagnostic or lower threapeutic energy ranges, the radiation absorption characteristics are best determined by the electron density of the dosimeter, which should correspond to that of the tissue or other object to be irradiated. The amount of the colorimetric indicator is not critical, since amounts too small to affect materially the electron density of the dosimeter will produce an adequate color change. Typically, I have found that from $10^{-4}$ to $4 \times 10^{-4}$ moles of indicator per 1000 grams of combined halogenated hydrocarbon and paraffin is satisfactory.

The electron density D of a particular dosimeter composition, in electrons per cubic centimeter, may be calculated from the following equation:

$$(1a) \qquad D = Ap \sum_{i=1}^{n} \frac{XiNi}{Mi}$$

In Equation 1a, A is Avagodro's number, $p$ is the density of the composition in grams per cubic centimeter, $n$ is the number of molecular species in the composition, and $Xi$, $Ni$ and $Mi$ are the mole fraction, the total number of electrons in all of the atoms in the molecule, and the molecular weight, respectively, of the $i$th constituent molecular species of the composition. For single chemical Equation 1a becomes simply:

$$(1b) \qquad D = \frac{ApN}{M}$$

The radiation absorption characteristics of matter exposed to X-rays in the ranges mentioned above are found to be closely correlated with the electron density calculated from the above equations. While this method of expressing electron density is not directly applicable to mammalian tissue, because of its complex chemical structure, water has been generally accepted as the material most closely equivalent to soft tissue in this respect. The electron density of water, as given by Equation 1b, is:

$$D = 6.023 \times 10^{23} \times 1 \times 10/18 = 3.35 \times 10^{23}$$

For chloroform, the electron density is $4.38 \times 10^{23}$; for bromoform, it is $7.70 \times 10^{23}$. In liquid dosimeters, because large concentrations of bromoform or chloroform must be used to obtain satisfactory color indications, it is not practical to approximate the absorption characteristics of tissue. However, in the solid dosimeter of my invention, large amounts of paraffin, which has an electron density of about 2.5–3.2, depending on the average molecular weight, may be included, and the electron density nearly matched to that of tissue without destroying the radiation sensitivity of the dosimeter. As a typical example, a dosimeter comprising 3 moles of chloroform in 1000 grams of paraffin having a molecular weight of 660 would have a density of about 1.05 grams per cubic centimeter. The value of N for paraffin is about 378 for the molecular weight given, and that for chloroform is 58. The electron density would then be, from Equation 1a, $$D = 6.023 \times 10^{23} \times 1.05 \left( \frac{.335 \times 378}{660} + \frac{.665 \times 58}{119.4} \right)$$

$$D = 6.023 \times 1.05 \times .515 \times 10^{23} = 3.25 \times 10^{23}$$

Such a dosimeter would be sufficiently close to tissue to be satisfactory for use as a phantom in radiology, and the 3 molal concentration would give an excellent color intensity change. Using chloroform and bromoform, and mixtures of the two, in a paraffin matrix, I have made dosimeters having electron densities ranging from $2.8 \times 10^{23}$ to $3.0 \times 10^{23}$ electrons per gram, or from about 2.6 to 3.8 electrons per cubic centimeter.

While various modifications which may be made in the dosimeter of my invention will be discussed in detail below, for present purposes a typical embodiment will be described in which the solid matrix is paraffin including 0.5 percent of purified beeswax, 1 mole of chloroform for each thousand grams of solid matrix, and 100 mg. of methyl yellow (p-dimethylaminoazobenzene $(CH_3)_2NC_6H_4N:NC_6H_5$)

Figure 2:
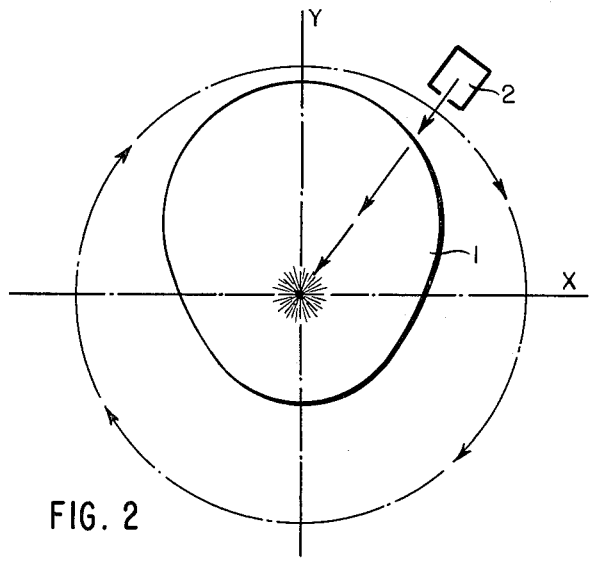
FIG. 2 is a section through the radiation dosimeter of FIG. 1, taken essentially along the lines 2—2 of FIG. 1, and illustrating the typical colorimetric radiation pattern produced by radiation in the manner shown in FIG. 1.

This dosimeter may be made by dissolving the azo dye in the chloroform and adding it carefully to the melted paraffin at a temperature between 60 and 80° C. The mixture may then be poured into the desired mold, which is preferably kept relatively warm, and allowed to cool slowly. Referring again to FIG. 1, the typical dosimeter just described will appear in the form of a human head made of yellow waxy material. Upon the exposure of any part of this dosimeter to radiation, there will immediately appear a red color having a depth proportional to the amount of radiation absorbed. In practice, assuming that the model 1 represents a human head in which a region to be treated is located at the intersection of the axes X and Y, a radiation source 2 is moved about the head in the plane of the axes X and Y, causing the intersection of the axes to be irradiated more strongly than the surrounding region. As shown in FIG. 2, upon slicing the model 1 along the lines 2—2 a radiation pattern will be seen as a red color, having a depth or density proportional to the amount of radiation absorbed, in place of the yellow color of the surrounding material which has received less radiation. The location of the point of maximum radiation can be immediately ascertained by this method, and the amount of radiation absorbed by the particular treatment can be measured spectrophotimetrically, by known techniques, or by cutting a slab of the model 1 of a selected thickness and measuring its optical transmission or reflectance characteristics at specific wave lengths, in a manner which will be made clear below.

Figure 3:
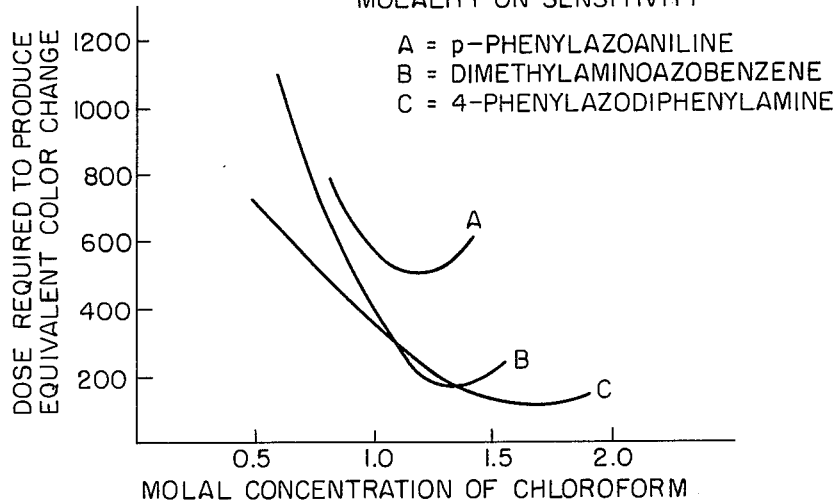
FIG. 3 is a graph illustrating the dose required to produce a reference color change in various radiation dosimeters in accordance with my invention as a function of the concentration of the radiochromatic couple in the solid matrix.

The color change produced in the dosimeter of my invention by radiation can be long-lasting, especially when the dosimeter is maintained in solid form, and preferably at a relatively low temperature; some radiation changes produced may be considered substantially permanent. However, a degree of reversibility in the color change may be illustrated by heating the dosimeter to melt it, upon which the color change essentially disappears. It may be brought back by resolidifying the material, indicating that the chemical reactions occurring are of a reversible nature, and that the initial reaction to the radiation is substantially irreversible. The reaction mechanics of colorimetric reactions induced by ionization produced by radiation are not understood even in solution, but are believed to involve a series of chain reactions. In view of the fact that liquid solutions of radio-chromatic couples appear to follow Beer's law directly, and the dispersions in a solid matrix do not, it would appear that the effect of the solid matrix is to shift the reaction equilibrium in one direction at lower concentrations and in an opposite direction at higher concentrations. However this may be, it is indeed a fact that the intensity of the color change produced is directly related to concentration in a way that is entirely different from that observed in solutions. Referring to FIG. 3, typical graphs of dosage required to produce an equivalent color change vs. concentration for various radiochromatic couples are shown. As noted above, it will be seen that the maximum depth of color appears in the region of from 1 to 2 molal concentration of the radiation sensitive substance in the matrix, with individual variations characteristic of the azo dye used as a constituent of the radiochromatic couple.

As further illustrative of the effect of the solid or liquid state of the matrix, a series of experiments made with refined aliphatic mineral oil as the matrix will next be described. The oil was a highly viscous liquid at room temperature. Dosimeter formulations containing various molal concentrations of chloroform in mineral oil, from 0.5 molal to pure chloroform, with $10^{-4}$–$10^{-3}$ molal 4-phenylazodiphenylamine as the indicator, were irradiated with a constant dose of 2 mev. X-rays, one set of the various concentrations being irradiated as a liquid at room temperature, and another identical set as a solid at $-85°$ C. There was a striking difference in the color response of the two sets. In the liquid state, the dosimeter was quite consistent with Beer's law in that the highest concentrations of chloroform or bromoform in mineral oil were associated with the most intense color change. The same dose of radiation produced an entirely different effect in the solid formulations; the deepest colors occurred in the 1–3 molal range; at the lowest concentration, a very faint color was produced, which deepened as the concentration increased to a peak at about a 3 molal concentration, and then decreased as the concentration further increased until, at the extreme in which pure solid chloroform and bromoform dosimeters were irradiated, no color was produced and the solid remained yellow.

When the solidified mineral oil dosimeters were allowed to liquify, a surprising development occurred. The color pattern gradually shifted so that the most intense change was manifest in the highest concentrations of chloroform, with the deepest colors evident in the pure halogenated hydrocarbon. Most of the colors are lost after several hours in the liquid state, but may be restored by re-solidifying the matrix. After standing for a day or more, a precipitate forms in irradiated liquid dosimeters which have previously lost their color. I have found that the amount of the precipitate is proportional to dose. Accordingly, it may be separated and redissolved in a smaller volume of a suitable solvent, such as pure chloroform or bromoform, whereby the intensity of color is made more pronounced and may be evaluated more easily. Alternatively, the precipitate may be dried and weighed to measure the dose of radiation which produced it.

When the mineral oil dosimeters which were irradiated in the liquid state were solidified, the color pattern shifted to that shown by the dosimeters which had been irradiated in the solid state, although the pure chloroform did not return entirely to the initial yellow color.

I have found that mere traces of water greatly reduce the radiation response of the solid paraffin dosimeter of my invention. Amounts of as little as 0.005 percent by weight of water markedly reduce the intensity of the radiation-induced color change, or cause a previously established color change to disappear. Included water will prevent the red color change characteristic of methyl yellow at doses of radiation as high as 10,000 roentgens.

In contrast to the effects of water, other chemicals have been found to enhance the radiation sensitivity of the dosimeter of my invention. Surprisingly, in view of their behavior in aqueous systems, alcohols and phenols have been found to enhance the color response, especially in chloroform systems. For example, ethanol, propanol, butanol, resorcinol and hexylresorcinol have all demonstrated a color enhancing effect, which is most marked in concentrations close to saturation in the matrix. One of the most effective enhancing agents is p-phenylazophenol. In molal concentrations about fifteen to twenty-five times that of the methyl yellow, p-phenylazophenol not only enhances the color effect, but also serves as a stabilizer of the system, making it less sensitive to visible light photons. When p-phenylazophenol, which is a yellow dye, is used, it is advisable to decrease the amount of methyl yellow.

Besides methyl yellow, numerous other indicators have been found successful as components of the radiochromatic couple used in the dosimeter of my invention. A great many chromogens were examined for radiation sensitivity in the paraffin base dosimeter. Of these, azo compounds with the chromophore group —N:N—, which also included an auxochrome group, appeared to be the best. Dimethylaminoazobenzene (methyl yellow), p-phenylazoaniline, and 4 - phenylazodiphenylamine were found to be the best of the indicators tested in chloroform or bromoform-containing paraffin based dosimeters, but 4-phenylazo-1-naphthylamine, 4-phenylazoresorcinol, 3-methyl-4-phenylazophenol, p-phenylazophenyl isocyanate, and 4-(p-phenylazophenyl) semicarbazide were also used successfully, with best results in the molal concentration range of $10^{-4}$ to $4\times10^{-4}$, based on 1000 grams of the combined paraffin and halogenated hydrocarbon. Other dyes that have demonstrated radiation-induced color changes by gross visual inspection are 4,4',4''-methylidyne-tris - (N,N - dimethylaniline), diphenylthiocarbazone, Rhodamine 6G, Galloyanine, Methyl Green, and Quinaldine Red.

The most useful radiation sensitive materials that I have found are the halogenated hydrocarbons, preferably chloroform, bromoform, iodoform, and mixtures thereof. Placed directly into paraffin, iodoform has a low solubility, but when first dissolved in bromoform it mixes well with the matrix. Other halogenated hydrocarbons which have induced an observable color change with methyl yellow by X-ray doses below 5,000 roentgens are carbon tetrachloride, carbon tetrabromide, ethylene bromide, hexachloroethane, trichloroethylene, 1,1,1, - trichloroethane, tetrachloroethylene, heptachloropropane, 2,2,2 - trichloro-1-ethoxyethanol, 2-bromo-2-chloro-1,1,1- trifluoroethane, hexachlorocyclohexane, a,a,a - trichlorotoluene, and a,a,a-trifluorotoluene.

The dosimeter of my invention will apparently respond to any radiation which will produce ionization. Thus, 50–2000 kvp. X-rays, gamma rays from sources such as cobalt-60, iodine 131 and radium, electrons emitted by sources such as strontium 90 and phosphorous 32, protons from a 160 mev. cyclotron, and thermal neutrons from a nuclear reactor have all been found to produce a color response in the solid dosimeter. In general, I have found that dosimeters based on chlorinated compounds are less dependent upon photon energies in their response to radiation than are dosimeters containing brominated compounds. The latter tend to respond with a deeper color change to soft X-rays than to harder X-rays for the same dose.

Combination color effects may be obtained within the scope of my invention by using more than one indicator, or two or more different radiochromatic couples, in the matrix. The solid nature of the matrix prevents diffusion, and thus allows different colors and degrees of color to be present in the same dosimeter, which is not possible in a liquid dosimeter. For example, a paraffin matrix dosimeter was made in which a first radiochromatic couple comprising methyl yellow and chloroform and a second radiochromatic couple comprising dithizone and carbon tetrachloride were both included. Small amounts of aniline were also added, to lower the sensitivity of the methyl yellow so that its conversion to red would follow the disappearance of the dithizone green as the dose increased. In this manner, a dosimeter was made which displayed a shift from green to yellow to red with increasing doses of radiation. I have also produced multiple color effects with a single radiochromatic couple consisting of bromoform and 4-phenylazodiphenylamine in paraffin. The color shift in this dosimeter was from bright yellow to red to a deep purple with increasing doses of radiation.

As typical examples of the manner in which my invention may be carried out, solid paraffin and paraffin-wax combinations, the latter containing various common plant and animal waxes in amounts ranging from 0 to 50 percent by weight, were mixed with chloroform and bromoform in concentrations of halogenated hydrocarbon ranging from 4 to 40 percent by weight. Each kilogram of mixture contained 100 mg. of methyl yellow (p-methylaminoazobenzene, $(CH_3)_2NC_6H_4N:NC_6H_5$). The azo dye was dissolved in the chloroform or bromoform, and added carefully to the melted paraffin or paraffin wax, depending on the particular formulation, at a temperature between 60 and 70° C. No significant loss of halogenated hydrocarbon by evaporation occurred during mixing.

The melted dosimeters formed as just described were poured into rectangular silicone-treated aluminum molds, and allowed to solidify. The molds were prepared by baking on a thin layer of silicone resin, the one used being SC–87 Dri-Film, a product of Silicone Products Department, General Electric Co., Waterford, New York. The purpose of the silicone treatment was merely to facilitate the release of the solid dosimeters from the molds; other suitable means will occur to those skilled in the art. When removed from the molds, the dosimeters were light yellow blocks similar in texture and hardness to the original paraffin or paraffin-wax matrix.

The dosimeter blocks were irradiated with various types of radiation, including 200 kilovolt peak X-rays corresponding to a half-absorption value layer of 0.65 mm. of copper, 280 kvp. X-rays (13 mm. Cu h.v.l.), 2000 kvp. (13 mm. Cu h.v.l.) X-rays, Co–60 gamma rays, radium radiation, and corpuscular radiation from a strontium 90-ytterbium 90 plaque.

In response to radiation, the dosimeters instantly turned red in the irradiated regions, with an intensity of color proportional to the amount of the absorbed dose. In dosimeters containing higher concentrations of bromoform, a faint red conversion was noticeable by visual inspection at doses less than 100 rads. On the other hand, the chloroform based dosimeters are less sensitive to visible light, and need only be protected from prolonged direct daylight.

Figure 4:
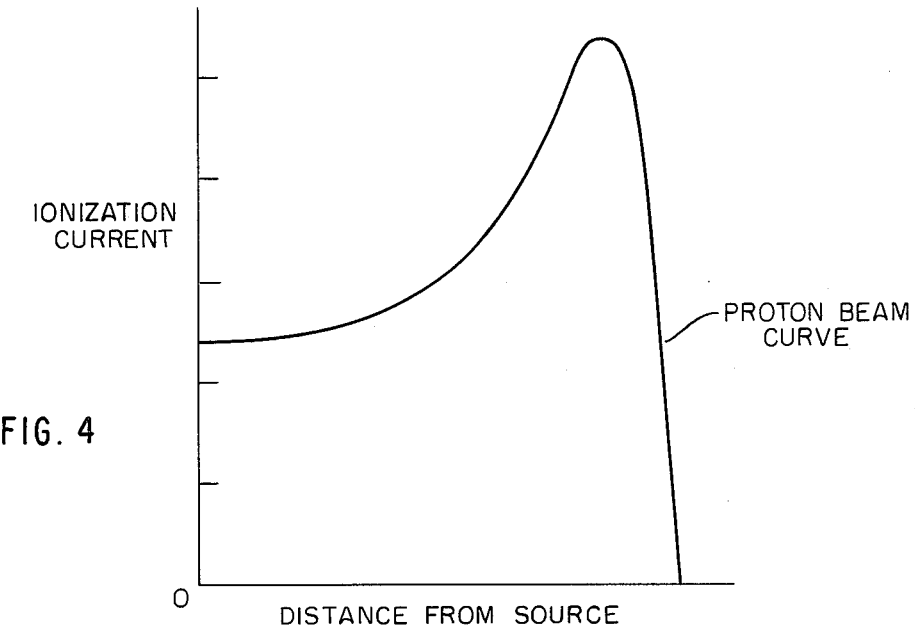
FIG. 4 is a graph illustrating the variation of ionization current produced in an ionization chamber as a function of the distance from the radiating source, a typical method of showing the extent of penetration of protons or of alpha particles in matter.

I have found that the radiation dosimeter of my invention is ideally suited to indicating graphically the linear energy transfer, or energy lost per unit length of radiation path, of protons. The so-called Bragg peak may be especially well illustrated by means of the dosimeter. Referring to FIG. 4, a typical graph of the ionization current produced in an ionization chamber in response to a source of radiation, as a function of the distance from the source in the ionization chamber, is shown. The graph is a typical one for protons, but alpha particles exhibit a similar effect. Surprisingly, the maximum ionization is produced at some distance from the source, and the amount of ionization thereafter falls off very sharply. This effect has been explained on the basis that particles gradually loose speed as they pass through the ionized medium, and eventually reach a value below which they are incapable of producing ionization. Presumably, the peak is due to the fact that the particles are in the latter portion of the ionizing range for a longer time than they are in the nearer portion, due to their greater speed in the nearer portion, and thus have a greater chance for ionizing collisions in the latter portion. However, whatever the true explanation of this phenomenon may be, it has been found in teaching that it is a difficult concept to communicate to the student. This problem may readily be solved by the use of the dosimeter of my invention. Referring now to FIG. 5, a typical arrangement for illustrating the manner in which protons are absorbed in matter is shown. A suitable source 2, of protons or alpha particles, is schematically shown, which is provided with an aperture through which the radiation is emitted. A dosimeter 4, in the form of a rectangular block, is exposed to the radiation through suitable apertures of various widths in a screen 3. As the radiation is applied to the dosimeter 4, a visual color change takes place which soon produces a three-dimensional picture, in red on the yellow dosimeter, of the extent of ionization which has taken place in the dosimeter. As shown at 5, the dark red line characteristic of the Bragg Peak is plainly apparent in the portion of the dosimeter irradiated by the widest beam. As the portal in the screen is made narrower, the peak becomes less distinct, and for narrow portals the peak disappears, to be replaced by a widened diffused zone. The student is thus able to see visually the changes which take place in matter, and to have the Bragg Peak illustrated to him as a concrete visible phenomenon. Where the level of radiation permits, the development of the color in the dosimeter may be observed directly, or through a plastic shield. Of course, at higher levels it will be desirable to view the irradiation of the dosimeter by means of a suitably shielded television or motion picture camera. Otherwise, dangerous exposure to the radiation may result.

Referring next to FIG. 6, I have shown apparatus for measuring electrically the amount of radiation absorbed in a dosimeter 4 in accordance with my invention. The apparatus comprises a source of light shown as a lamp 6, energized by a battery B through a switch S. The lamp 6 may be enclosed in a suitable housing 7 provided with an aperture 8 and space for inserting a suitable filter 9. The filter 9 may be employed to control the wave length of the light emerging from the aperture 8. A dosimeter 4 is mounted above the aperture 8, in such a manner that it absorbs a portion of the light emitted from the aperture 8. An additional filter 12 is placed above the dosimeter 4. The transmitted light is measured by a photocell 10, preferably of the self-generating barrier layer type. The photocell 10 is connected in a suitable indicating circuit. As here shown, the circuit comprises a conventional galvanometer G connected in series with the resistance element of a first control potentiometer P1 and a portion of the resistance element of a second potentiometer P2 selected by the wiper of the potentiometer P2. The photocell 10 is connected between the wiper of the potentiometer P1 and the junction terminal $a$ of the resistance elements of the potentiometers P1 and P2. The reading of the galvanometer G will then indicate the light transmission of the region of the dosimeter immediately adjacent the aperture 8 in suitable units, which may be selected by the adjustment of the potentiometers P1 and P2 and the calibration of the scale of the galvanometer G. It will be apparent that by suitably restricting the aperture 8, and by plotting the reading of the galvanometer G as a function of the position of the dosimeter 4 as it is moved in a predetermined manner across the aperture 8, an accurate two-dimensional graph of the amount of radiation absorbed in the dosimeter can be obtained. A third dimension may be added to this graph by slicing the dosimeter normal to its broader faces and making photometric measurements along the slices.

Using the dosimeter formulations which give a red color in response to radiation, I prefer to use a fluorescent lamp as the lamp 6, a yellow-green filter as the filter 9, and a green filter as the filter 12. With this combination, and a paraffin matrix dosimeter containing bromoform —4 and phenylazodiphenylamine as the radiochromatic couple, I have detected as little as 5 roentgens of radiation in the 50 to 3000 kvp. range with little difficulty.

In the application of the dosimeter of my invention to the measurement of radiation absorbed by the apparatus of FIG. 6, it is most convenient to make a first measurement of the optical transmission of the dosimeter before it is irradiated, and to use the transmission values so measured as a zero reference for the measurements that are made after irradiation. In this manner, the thickness of the dosimeter and its initial transmission are automatically taken into account.

The temperature of the dosimeter is of course a factor in the light transmission as measured by the apparatus of FIG. 6. However, I have found that the correction for temperature may readily be made. Specifically, if it is anticipated that unirradiated optical transmission values for a series of samples are to be measured at one temperature and their transmission values after irradiation with various doses will be measured at a second temperature, a control sample may be used which is measured without irradiation at both temperatures. The control sample should be of the same material as the samples to be irradiated, but need not have the same initial transmission; for example, it may be of different thickness. It is convenient to represent the color changes produced by radiation as the percent of the transmission of the unirradiated sample exhibited by the irradiated sample. To obtain correct unirradiated transmission values for the irradiated samples at the second temperature for use in computing these percentages, it is merely necessary to multiply the unirradiated transmission of the sample at the first temperature by the ratio of the transmission of the unirradiated control at the second temperature to its transmission at the first temperature.

In addition to its use in the direct measurement of absorbed radiation, the dosimeter of my invention is also useful in radiography. Thus, a dosimeter in the form of a thin sheet or slab may be placed behind an object of which a radiograph is desired, and, upon sufficient radiation of the object, a clear radiograph will quickly be produced. Radiographs produced in this manner are in many respects clearer and more informative than those produced on photographic film, presumably because the dosimeter of my invention is less energy dependent in its response to radiation.

While I have described various embodiments of my invention in detail, many changes and variations will occur to those skilled in the art upon reading my description, and such can obviously be made without departing from the scope of my invention.

Having thus described my invention, what I claim is:

1. A radiation dosimeter, comprising a radiochromatic couple suspended in an essentially anhydrous solid translucent matrix of waxy hydrocarbon material.

2. A radiation dosimeter, comprising an indicator and a halogenated hydrocarbon suspended in an essentially anhydrous solid translucent matrix of waxy hydrocarbon material.

3. In combination, a solid mass of fusible waxy high molecular weight hydrocarbons, and a minor proportion by weight of a radiation sensitive material capable of developing visibly detectable color therein on exposure to radiation at doses in the range of 5 to 5000 roentgens dissolved in said mass.

4. A radiation dosimeter consisting of a ½ to 5 molal solid solution of a halogenated hydrocarbon in paraffin, said solution containing a sufficient amount of an acidimetric indicator to register a measureable change in color upon exposure of the solid solution to radiation at doses in the range of 5 to 5000 roentgens.

5. A radiation dosimeter containing the composition of claim 4 and a member of the class consisting of alcohols and phenols.

6. An in-phantom dosimeter comprising a solid thermoplastic amorphous waxy hydrocarbon material, and a halogenated organic compound and a colorimetric indicator distributed through said material.

7. A radiation dosimeter, comprising an essentially anhydrous solid translucent waxy hydrocarbon matrix shaped to conform to a part to be irradiated and having radiation absorption characteristics related to the characteristics of the part, said matrix having dispersed therein a radiochromatic couple in amounts sufficient to produce a visual color change in the range of doses from 5 to 5000 roentgens.

8. A dosimeter, comprising a matrix consisting essentially of aliphatic hydrocarbons having an average molecular weight high enough to be solid at 25° C., from ½ to 5 moles of halogenated hydrocarbons per thousand grams of aliphatic hydrocarbons dispersed in said matrix, and from $10^{-4}$ to $4 \times 10^{-4}$ moles of an acidimetric indicator per thousand grams of total hydrocarbons dispersed in said matrix.

9. A radiation responsive composition, consisting essentially of from $10^{-4}$ to $4 \times 10^{-4}$ moles per 1000 parts of composition of an acidimetric indicator, the balance being solid aliphatic hydrocarbons and from ½ to 5 moles of halogenated hydrocarbons per 1000 grams of aliphatic hydrocarbons.

10. The method of measuring radiation comprising the steps of exposing a dispersion of a radiochromatic couple in a solid matrix to a source of radiation, melting the matrix and maintaining it in a liquid state until a precipitate is formed, and weighing the precipitate.

11. The method of measuring radiation comprising the steps of exposing a dispersion of halogenated hydrocarbon and an acidimetric indicator in an aliphatic hydrocarbon having an average of at least 25 carbon atoms per molecule to a source of radiation to be measured, maintaining the exposed dispersion in a liquid state until a precipitate is formed, and weighing the precipitate.

12. The method of measuring radiation, comprising the steps of exposing a dispersion of a radiochromatic couple in a hydrocarbon matrix to a source of radiation maintaining the dispersion in a liquid state until a precipitate is formed, separating the precipitate, dissolving it in a volume of solvent smaller than the volume of the dispersion, and measuring the color intensity of the solution so formed.

13. An in-phantom dosimeter comprising a solid thermoplastic amorphous waxy hydrocarbon material having an electron density between $2.5 \times 10^{23}$ and $3.5 \times 10^{23}$ and containing a radiochromatic couple distributed throughout said material.

References Cited by the Examiner

UNITED STATES PATENTS

| | | | |
|---|---|---|---|
| 2,957,080 | 10/1960 | Schulte et al. | 250—83 |
| 3,031,575 | 4/1962 | Gevantman et al. | 250—83 |
| 3,102,197 | 8/1963 | Acitelli | 250—83.3 |

OTHER REFERENCES

Gamma Ray Dosimetry with Cellophane-Dye Systems, by Henley, Nucleonics, vol. 12, No. 9, September 1954, pages 62 to 63.

Gamma Ray Dosimetry With Polyvinyl Chloride Films, by Henley et al., Nucleonics, vol. 9, No. 6, December 1951, pages 62 to 66.

RALPH G. NILSON, *Primary Examiner.*

J. W. LAWRENCE, *Assistant Examiner.*